(12) United States Patent
Zummo et al.

(10) Patent No.: US 10,312,992 B2
(45) Date of Patent: *Jun. 4, 2019

(54) METHOD FOR RELAY SELECTION IN COGNITIVE RADIO NETWORKS

(71) Applicant: KING FAHD UNIVERSITY OF PETROLEUM AND MINERALS, Dhahran (SA)

(72) Inventors: Salam Adel Zummo, Dhahran (SA); Yasser Fadhl Ali Al-Eryani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,326

(22) Filed: Jan. 29, 2018

(65) Prior Publication Data

US 2018/0152233 A1    May 31, 2018

Related U.S. Application Data

(63) Continuation of application No. 15/056,095, filed on Feb. 29, 2016, now Pat. No. 9,887,747.

(51) Int. Cl.
| | |
|---|---|
| *H04B 7/155* | (2006.01) |
| *H04L 27/00* | (2006.01) |
| *H04B 7/026* | (2017.01) |
| *H04B 7/0413* | (2017.01) |

(52) U.S. Cl.
CPC ............ *H04B 7/155* (2013.01); *H04B 7/026* (2013.01); *H04B 7/0413* (2013.01);
(Continued)

(58) Field of Classification Search
None
See application file for complete search history.

(56) References Cited

U.S. PATENT DOCUMENTS

| | | | |
|---|---|---|---|
| 8,605,670 B2 | 12/2013 | Jo et al. | |
| 8,853,303 B2 | 10/2014 | Al-Aqeeli et al. | |

(Continued)

FOREIGN PATENT DOCUMENTS

CN    102223644 B    7/2013

OTHER PUBLICATIONS

G. Chen, Z. Tian, Y. Gong and J. Chambers, "Decode-and-Forward Buffer-Aided Relay Selection in Cognitive Relay Networks," in IEEE Transactions on Vehicular Technology, vol. 63, No. 9, pp. 4723-4728, Nov. 2014.doi: 10.1109/TVT.2014.2311301 (Year: 2014).*

(Continued)

*Primary Examiner* — Kodzovi Acolatse
(74) *Attorney, Agent, or Firm* — Oblon, McClelland, Maier & Neustadt, L.L.P.

(57) ABSTRACT

Decode and forward buffer aided relay selection and transmission power allocation systems and method are provided for cognitive radio network that is equipped with multiple-input-multiple-output (MIMO). A low complexity MIMO-based relay selection scheme that maximizes the single-hop normalized sum rate of the primary network (PN) and secondary network (SN) is proposed including a sub-optimal antenna transmission power allocation scheme that maximizes the single-hop normalized sum rate of the PN and the SN is proposed. For power optimization, first, optimal expressions for the transmission power per antenna of both the PN and SN nodes are derived separately. The derived expressions are then used in an iterative algorithm to produce a near-optimum solution that maximizes the normalized sum rate per time slot.

2 Claims, 11 Drawing Sheets

(52) U.S. Cl.
CPC ..... *H04B 7/15507* (2013.01); *H04L 27/0006* (2013.01); *Y02D 70/00* (2018.01); *Y02D 70/1262* (2018.01); *Y02D 70/1264* (2018.01); *Y02D 70/21* (2018.01); *Y02D 70/442* (2018.01); *Y02D 70/444* (2018.01); *Y02D 70/446* (2018.01)

(56) References Cited

U.S. PATENT DOCUMENTS

| | | | | |
|---|---|---|---|---|
| 2004/0233918 | A1* | 11/2004 | Larsson | H04B 7/155 370/400 |
| 2007/0160014 | A1 | 7/2007 | Larsson | |
| 2008/0165720 | A1 | 7/2008 | Hu et al. | |
| 2011/0305144 | A1* | 12/2011 | Sethakaset | H04B 7/15592 370/246 |
| 2013/0016652 | A1 | 1/2013 | Ke et al. | |
| 2013/0114500 | A1 | 5/2013 | Liu et al. | |
| 2014/0112162 | A1* | 4/2014 | Tavildar | H04W 48/08 370/252 |
| 2014/0254472 | A1* | 9/2014 | Wang | H04W 72/042 370/315 |

OTHER PUBLICATIONS

Zhao Tian, et al., "Buffer-Aided Max-Link Relay Selection in Ampiify-and-Forward Cooperative Networks", IEEE Transactions on Vehicular Technology, vol. 64, No. 2, Feb. 2015, pp. 553-565.

Mehdi Gharnari Adian, et al., "Optimal and Suboptimal Resource Allocation in MIMO Cooperative Cognitive Radio Networks", Hindawi Publishing Corporation, Journal of Optimization, vol. 2014, Article ID 190196, Aug. 31, 2014, 13 pages.

Yong-Up Jang, et al., "A Two-Step Approach to Power Allocation for OFDM Signals Over Two-Way Amplify-and-Forward Relay", IEEE Transactions on Signal Processing, vol. 58, No. 4, Apr. 2010. pp. 2426-2430.

Hamed Rasouli, "Cooperative Subcarrier and Power Allocation in OFDM based Relaying Systems", Ryerson University, 2012, 154 pages.

Ioannis Krikidis, et al., "Buffer-Aided Relay Selection for Cooperative Diversity Systems without Delay Constraints" IEEE Transactions on Wireless Communications, vol. 11, No. 5, May 2012, pp. 1957-1967.

Aissa Ikhlef, Diomidis S. Michalopoulos and Robed Schober "Max-Max Relay Selection for Relays with Buffers" IEEE Transactions on Wireless Communications, vol. 11, No. 3, Mar. 2012.

Peng Xu, Zhiguo Ding, Ioannis Krikidis and Xuchu Dai, "Achieving Optimal Diversity Gain in Buffer-Aided Relay Networks With Small Buffer Size" IEEE Transactions on Vehicular Technology, vol. 65, No. 10, Oct. 2016.

Thernistoklis Charalambous, Nikolaos Nomikos, Ioannis Krikidis, Demosthenes Vouyioukas, Member and Mikael Johansson "Modeling Buffer-Aided Relay Selection in Networks with Direct Transmission Capability" IEEE Communications Letters, vol. 19, No. 4, Apr. 2015.

* cited by examiner

METHOD FOR RELAY SELECTION IN COGNITIVE RADIO NETWORKS

CROSS-REFERENCE TO RELATED APPLICATIONS

The present application is a Continuation of Ser. No. 15/056,095, now allowed, having a filing date of Feb. 29, 2016.

BACKGROUND

Field of Disclosure

Embodiments described herein generally related to systems and methods for reducing complexity and processing time in relay selection and power allocation schemes for cognitive multiple-input multiple-output buffer-aided decode-and-forward relay networks.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Currently, wireless communications is witnessing substantive and continuous developments to fulfil the growing demands of network users for high-speed multimedia services with high quality of service. In this regard, power and frequency parameters are amongst the most important resource considerations in wireless communication networks and are subjected to strict laws to control their allocation and usage among service providers.

Using underlay cognitive radio (CR) networks, the secondary user (SU) and the primary user (PU) can access the same spectrum simultaneously as long as the secondary network (SN) interference on the primary network (PN) does not exceed a certain interference threshold. However, interference will affects both the PN and SN due to the simultaneous usage of the same spectrum. This issue requires more investigation in designing joint power scheduling schemes.

A major drawback in the current state of the technology is how to handle the power rate and data rate of the PN during the selection of a most suitable relay device between a source device and a destination device and a way to optimize antenna transmission power of the PN. Another challenge occurs in selecting the most suitable relay device, or optimal relay device, in multiple-input multiple-output (MIMO) cooperative networks because it requires optimizing the antenna transmission power for each possible relay device, followed by calculating a single-hop rate and then selecting the relay device with the maximum normalized rate which is considered to be a slow and complicated process.

Unlike conventional unbuffered relaying schemes, data transmission in buffer-aided relaying is not restricted to two consecutive time slots to accomplish end-to-end packet transmission. Instead, information packets could be stored in a relay buffer of certain maximum size for an arbitrary number of time slots until the best channel conditions on the relay-destination link are met. This buffering operation splits the power allocation problem into two problems, the first being on the source-relay link (link between source device and relay device) and the other is on the relay-destination link (link between relay device and destination device). As a result, complexity of targeted optimized functions may be decreased.

One practical relay selection scheme for buffer-aided relaying is Max-Link relay selection protocol. In this protocol, at any given time slot, based on the channel state information measured, a decision is made whether the source or the relay conducts its transmission. For implementation in MIMO systems, Max-Link relay selection may be less effective for MIMO cooperative networks than for single-antenna implementation because a set of channel gains affect the link capacity and no general measure of MIMO channel quality is defined. Accordingly, an iterative process in which MIMO-based relay selection algorithms are set based on discrete iterative stochastic optimization for the uplink of cooperative MIMO networks may be needed. Furthermore, there is a need to develop a solution to enhance the efficiency of power and frequency usage, including hybrid combination use of CR, cooperative communication, power allocation, buffer-aided relaying and MIMO antenna schemes that maximizes the single-hop normalized sum rate of a PN and SN rates.

SUMMARY

The presented disclosure is provided for the system of cognitive buffer-aided decode-and-forward (DF) relay network that is equipped with MIMO antenna devices. This disclosure first provides a MIMO-based relay selection scheme that maximizes the single-hop normalized sum rate of the primary and secondary networks. The presented disclosure further provides a method of antenna transmission power allocation that allocate a total power budget among all primary and secondary networks transmitting antennas in a way such that the single-hop normalized sum rate of the primary and secondary networks is maximized.

According to exemplary aspects, there is provided a cognitive radio network system including a primary network that is consist of one or more primary source devices and one or more primary destination devices and a secondary network that is consist of one or more secondary cognitive source devices, one or more secondary destination devices, a predetermined number of cognitive decode-and-forward (DF) relays and a central processing unit. The processor is configured to transmit data packets from the primary network for every time slot during network operation on a continuous basis, select a source-relay link or a relay-destination link within the secondary network to transmit data, wherein the one or more primary source devices, primary destination devices, secondary source devices, secondary destination devices and cognitive DF relays are equipped with a MIMO system that aims to enhance the overall network multiplexing gain. The process may further identify a MIMO channel for transmission on a source-relay link, or a relay-destination link. This MIMO channel is divided into a predetermined number of parallel, independent, and ranked channels in a way such that the multiplexing gain of the overall system is enhanced.

According to other exemplary aspects of the present disclosure there is provided a method for relay selection within a cognitive radio secondary network and then antenna transmission power allocation within a cognitive secondary and a non-cognitive primary networks, the method being performed by a central processor. The method including first identify the best MIMO link in the cognitive secondary network in a way that the overall sum of the primary and secondary network rates is maximized. Secondary network processor may select one source-relay link or one relay-destination link depending on the overall MIMO channel quality. Second, after the best secondary network link is selected, a total power budget is then allocated optimally/sub-optimally among all transmitting primary and secondary antennas per time slot.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

The description provided herein is presented to enable one of ordinary skill in the art to make and use the invention and is provided in the context of a patent application and its requirements. Various modifications to the exemplary embodiments and the principles and features described herein will be readily apparent. The exemplary embodiments are mainly described in terms of particular processes and systems provided in particular implementations. However, the processes and systems will operate effectively in other implementations. Phrases such as "exemplary embodiment", "one embodiment" and "another embodiment" may refer to the same or different embodiments. The embodiments are described with respect to methods that may include more or less components than those shown, and variations in the arrangement and type of the components may be made without departing from the scope of the invention.

The exemplary embodiments are described in the context of methods having certain steps. However, the methods can operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by appended claims.

Additionally, where a range of values is provided, it is to be understood that each intervening value between an upper limit and a lower limit of the range, and any other stated or intervening value in that stated range is encompassed within the present disclosure. Where the stated range includes upper and lower limits, ranges excluding either of those limits are also included in the present disclosure. Furthermore, unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Figure 1:
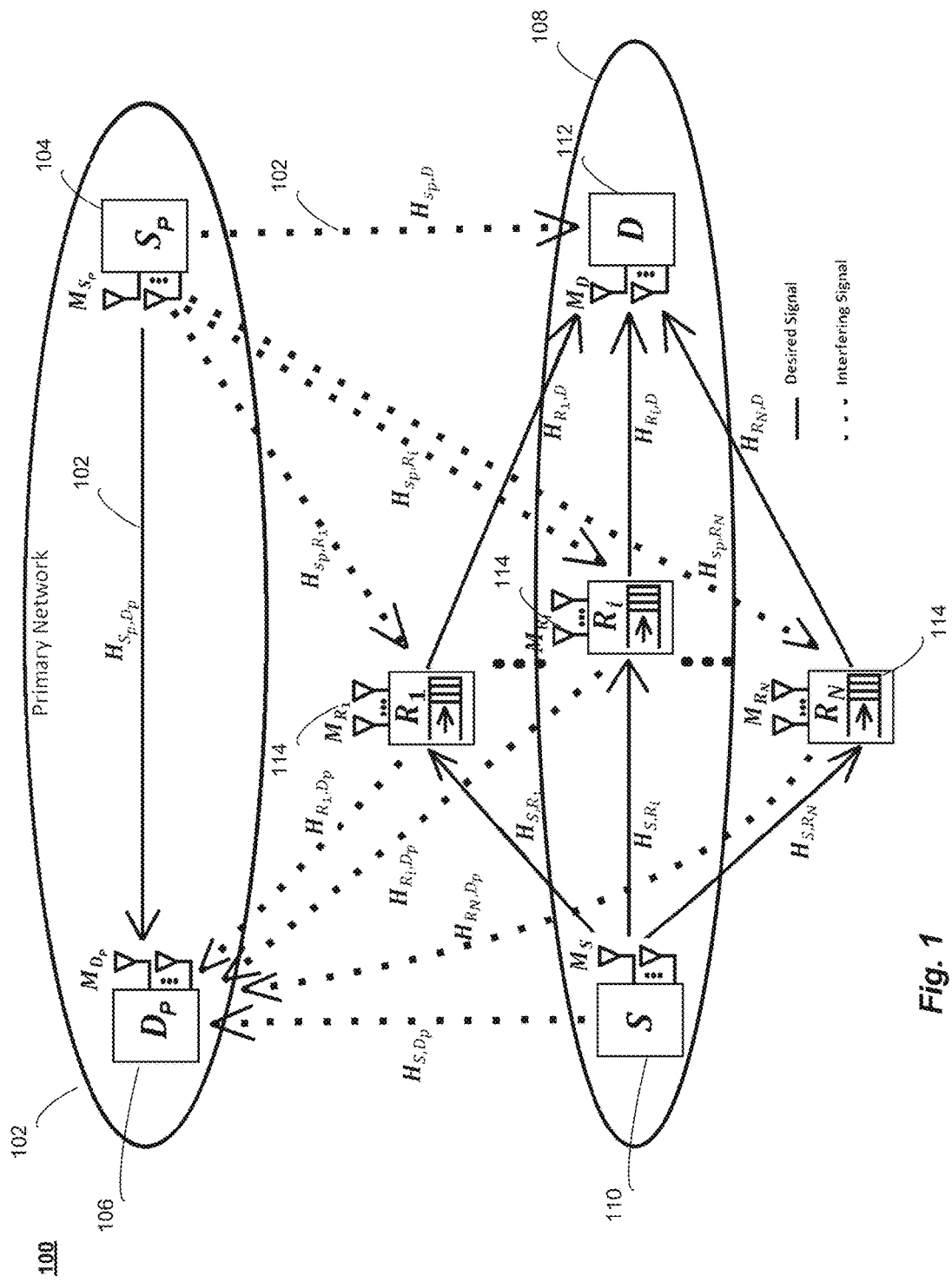
FIG. 1 is a diagram of an exemplary system model for a cognitive radio network with MIMO buffer-aided DF relays.

FIG. 1 illustrates an exemplary system model for a cognitive radio network with MIMO buffer aided DF network. The system model is not limited to DF networks and can be further implemented in any type of relaying networks, including, for example, amplify-and-forward networks and compress-and-forward networks. Because DF networks is a practical relaying scheme in use in cooperative relay networks, including Long-Term Evolution (LTE) networks and LTE-advanced networks, DF networks will be used to illustrate exemplary aspects of the present disclosure. However, non-limiting use of the following exemplary embodiments may be applied in any and all of the relaying networks, including but not limited to the above cited relay network.

CR network 100 includes primary network 102 with a primary user (PU) source ($S_p$) 104 and a PU destination ($D_p$) 106. As can be appreciated by one of ordinary skill in the art, CR 100 may include one or more primary user sources and one or more primary user destinations. Thus, $S_p$ 104 and $D_p$ 106 are merely exemplary. Secondary network (SN) 108 may include one or more secondary user (SU) sources (S), such as source 110, one or more SU destinations (D), such as destination 112, and N cognitive DF relays $[R_i]_{i=1}^{i=N}$ 114, N being an integer equal to or greater than 1. Each relay 114 may be equipped with a buffer of maximum size L, where L is the number of data packets that can be stored in the buffer before an overflow occurs. All $S_p$ 104, $D_p$ 106, S 110, D 112 and the $i^{th}$ relay are assumed to be equipped with $M_{S_p}$, $M_{D_p}$, $M_S$, $M_D$, and $M_{R_i}$ antennas, respectively. In one example, the antennas may be MIMO antennas used to achieve multiplexing gain using singular value decomposition (SVD) method. The instantaneous number of stored decoded information packets in the $i^{th}$ relay's buffer are denoted by $\Psi(R_i)$, where $0 < \Psi(R_i) < L$. The system model illustrated in FIG. 1 further illustrates the transmission and reception of desired signals (denoted as solid lines) and interfering signals (denoted as dotted lines).

In the current disclosure, $(.)^{-1}$, $(.)^T$ and $(.)^H$ denote a matrix inversion, transpose and Hermitian transpose respectively, diag(.) returns the diagonal of a matrix (.), $R_{(.)}$ returns the rank of a matrix (.), I denotes identity matrix (with appropriate dimensions) and $H \in \mathbb{C}^{G \times K}$ is a $G \times K$ matrix. $H^{m,:}$ and $H^{:,m}$ denote the $m^{th}$ row and column of a matrix H, respectively. Finally, $\mathbb{E}[.]$ denotes the statistical expectation operation.

The direct S-D link is assumed to be suffering from severe fading and shadowing effects due to interference caused by other equipment in the primary and secondary network and is hence ignored from the model. For example, the received signal at D 112 may suffer from multipath components due to buildings, automobiles and other distractive objects when passing from S 110 to D 112. Furthermore, the spectrum of interest is assumed to be utilized by using the concept of underlay cognitive radio for different PUs and SUs within the network and thus, PUs and SUs are assumed to access the same spectrum simultaneously as long as SUs respect the interference constraints established by the primary network. As such, in order to maintain a certain quality of service level to the PU, the average received interference power due to SUs must be set below a certain interference threshold level denoted by $I_{th}$. In one exemplary embodiment, at a certain time slot $t_1$, if an arbitrary S-R link is selected, source 110 may transmit its signals $X_S = [x_s^1, x_s^2, \ldots, x_s^{M_s}]^T$ with a power vector given bye $P_s = [p_s^1, p_s^2, \ldots, p_s^{M_s}]^T$, where $(.)^T$ returns the transpose of a matrix (.). On the other hand, if an arbitrary R-D link is selected, the $i^{th}$ best relay may use the first-in-first-out (FIFO) protocol and transmits its oldest stored information packet to the destination that is given by $$X_{R_i(t_2)} = [x_{R_i}^1, x_{R_i}^2, \ldots, x_{R_i}^{M_{R_i}}]^T$$

with a power vector given by $P_{R_i} = [p_{R_i}^1, p_{R_i}^2, \ldots, p_{R_i}^{M_R}]^T$. A central processor or processing circuit may assume the responsibility to execute the power allocation algorithm to select the best suitable link and antenna transmission power allocation as described further in FIG. 2.

In one example, PN 102 may trigger a transmission for every time slot t during network operation such that the transmitted information packet in the $S_p$-$D_p$ link is given by $$X_{S_{p(t)}} = [x_{s_p}^1, x_{s_p}^2, \ldots, x_{s_p}^{M_{s_p}}]^T$$

with a power vector given by $$P_{S_p} = [p_{s_p}^1, p_{s_p}^2, \ldots, p_{s_p}^{M_{s_p}}]^T.$$

A maximum allowable power budget ($P_T$) assigned for the combined networks (PN 102 and SN 108) at any arbitrary time slot may be defined as $$P_T = p_s^1 + \ldots + p_s^{M_s} + p_{s_p}^1 + \ldots + p_{s_p}^{M_{s_p}}$$

if one of the S-R links is selected for transmission or $$P_T = p_{R_i}^1 + \ldots + p_s^{M_{R_i}} + p_{s_p}^1 + \ldots + p_{s_p}^{M_{s_p}}$$

if one of the R-D links is selected for transmission, respectively. Furthermore, the complex channel gain matrices are defined as $H_{S,R_i} \in$ $$\mathbb{C}^{M_{R_i} \times M_S},$$

between S 110 and $R_i$ 114;

$$H_{S,D_p} \in \mathbb{C}^{M_{D_p} \times M_S},$$

between S 110 and $D_p$ 106; $H_{R_i,D} \in$ $$\mathbb{C}^{M_D \times M_{R_i}},$$

between $R_i$ 114 and D 112; $H_{R_i,D_p} \in$ $$\mathbb{C}^{M_{D_p} \times M_{R_i}},$$

between $R_i$ 114 and $D_p$ 106; $H_{S_p,D_p} \in$ $$\mathbb{C}^{M_{D_p} \times M_{S_p}},$$

between $S_p$ 104 and $D_p$ 106; $H_{S_p,R_i} \in$ $$\mathbb{C}^{M_{R_i} \times M_{S_p}}$$

between $S_p$ 104 and $R_i$ 114; and $H_{S_p,D} \in$ $$\mathbb{C}^{M_D \times M_{S_p}}$$

between $S_p$ 104 and D 112. In one embodiment, all channel coefficients may be independent and identically distributed slowly with varying Rayleigh fading random variables such that they remain unchanged during one time slot. To avoid the need for heavy and fast back-haul links, a central processor may be deployed to perform relay selection and power allocation operations, such as that described in FIG. 2 and enabled to provide full channel state information (CSI) acknowledgement.

Figure 2:
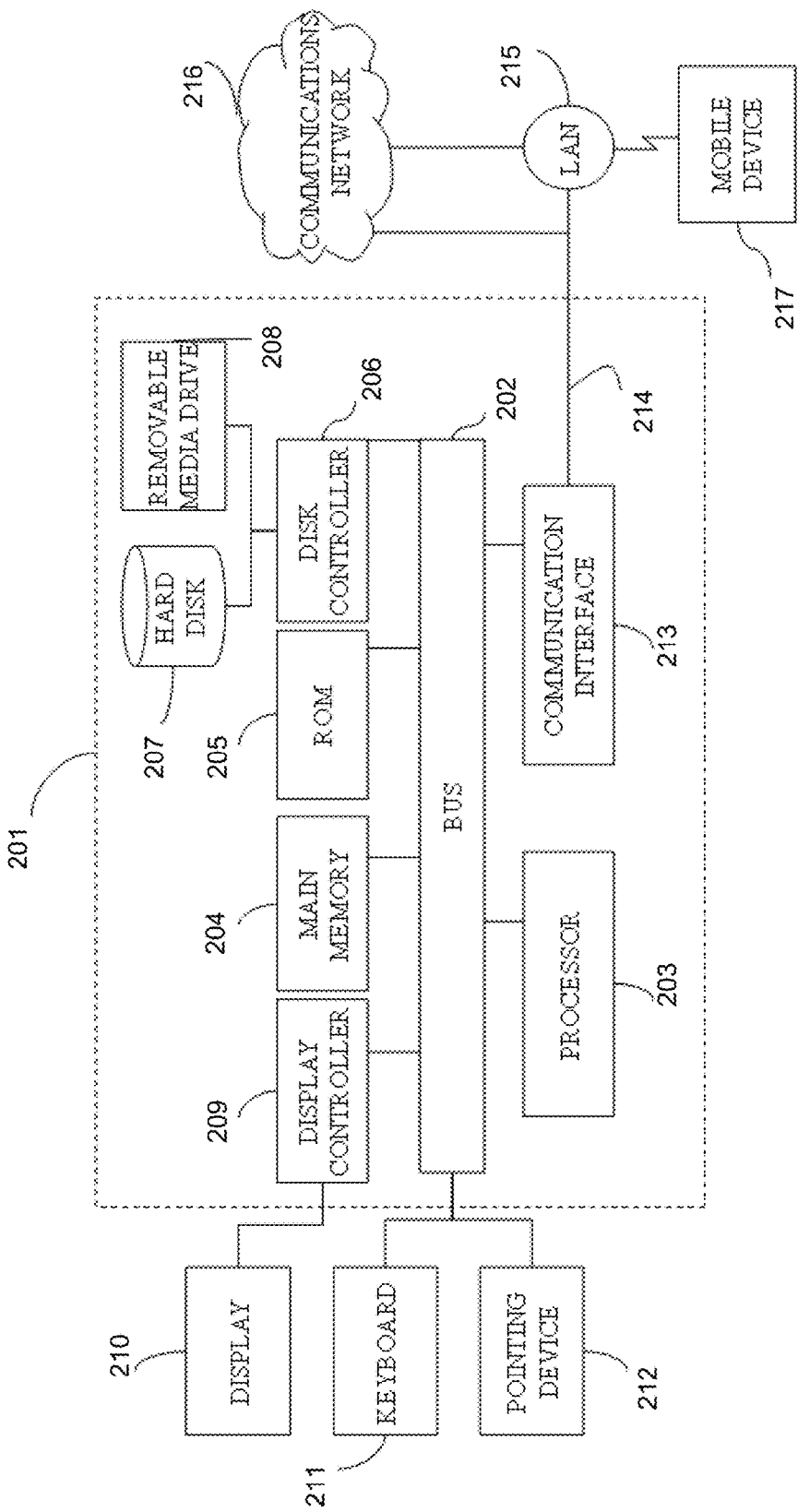
FIG. 2 is a block diagram of an exemplary computing device within the cognitive radio network according to exemplary aspects of the present disclosure.

The various features discussed above may be implemented by circuitry, such as a computer system (or programmable logic). FIG. 2 illustrates such a computer system 201 that may be representative of various user equipment in primary network 102 and secondary network 108, such as source 110, destination 112, relay devices 114, $S_p$ 104 and $D_p$ 106 and a central processor that may be deployed separately, remotely, or within any of the above mentioned devices to perform relay selection and power allocation operations. Computer system 201 may also represent a central processing system that performs relay selection and power allocation operations described in this disclosure in order to avoid heavy and fast back-haul links. According to one embodiment, the computer system 201 includes a disk controller 206 coupled to the bus 202 to control one or more storage devices for storing information and instructions, such as a magnetic hard disk 207, and a removable media drive 208 (e.g., floppy disk drive, read-only compact disc drive, read/write compact disc drive, compact disc jukebox, tape drive, and removable magneto-optical drive). The storage devices may be added to the computer system 201 using an appropriate device interface (e.g., small computer system interface (SCSI), integrated device electronics (IDE), enhanced-IDE (E-IDE), direct memory access (DMA), or ultra-DMA).

The computer system 201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 201 may also include a display controller 209 coupled to the bus 202 to control a display 210, for displaying information to a computer user. The computer system includes input devices, such as a keyboard 211 and a pointing device 212, for interacting with a computer user and providing information to the processor 203. The pointing device 212, for example, may be a mouse, a trackball, a finger for a touch screen sensor, or a pointing stick for communicating direction information and command selections to the processor 203 and for controlling cursor movement on the display 210.

The processor 203 executes one or more sequences of one or more instructions contained in a memory, such as the main memory 204. Such instructions may be read into the main memory 204 from another computer readable medium, such as a hard disk 207 or a removable media drive 208. One or more processors in a multi-processing arrangement may also be employed to execute the sequences of instructions contained in main memory 204. In alternative embodiments, hard-wired circuitry may be used in place of or in combination with software instructions. Thus, embodiments are not limited to any specific combination of hardware circuitry and software.

As stated above, the computer system 201 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 201, for driving a device or devices for implementing the invention, and for enabling the computer system 201 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 203 for execution. A computer readable medium may take many forms, including but not limited to, non-volatile media or volatile media. Non-volatile media includes, for example, optical, magnetic disks, and magneto-optical disks, such as the hard disk 207 or the removable media drive 208. Volatile media includes dynamic memory, such as the main memory 204. Transmission media, on the contrary, includes coaxial cables, copper wire and fiber optics, including the wires that make up the bus 202. Transmission media also may also take the form of acoustic or light waves, such as those generated during radio wave and infrared data communications.

Various forms of computer readable media may be involved in carrying out one or more sequences of one or more instructions to processor 203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 201 may receive the data on the telephone line and place the data on the bus 202. The bus 202 carries the data to the main memory 204, from which the processor 203 retrieves and executes the instructions. The instructions received by the main memory 204 may optionally be stored on storage device 207 or 208 either before or after execution by processor 203.

The computer system 201 also includes a communication interface 213 coupled to the bus 202. The communication interface 213 provides a two-way data communication coupling to a network link 214 that is connected to, for example, a local area network (LAN) 215, or to another communications network 216 such as the Internet. For example, the communication interface 213 may be a network interface card to attach to any packet switched LAN. As another example, the communication interface 213 may be an integrated services digital network (ISDN) card. Wireless links may also be implemented. In any such implementation, the communication interface 213 sends and receives electrical, electromagnetic or optical signals that carry digital data streams representing various types of information.

The network link 214 typically provides data communication through one or more networks to other data devices. For example, the network link 214 may provide a connection to another computer through a local network 215 (e.g., a LAN) or through equipment operated by a service provider, which provides communication services through a communications network 216. The local network 214 and the communications network 216 use, for example, electrical, electromagnetic, or optical signals that carry digital data streams, and the associated physical layer (e.g., CAT 5 cable, coaxial cable, optical fiber, etc.). The signals through the various networks and the signals on the network link 214 and through the communication interface 213, which carry the digital data to and from the computer system 201 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 201 can transmit and receive data, including program code, through the network(s) 215 and 216, the network link 214 and the communication interface 213. Moreover, the network link 214 may provide a connection through a LAN 215 to a mobile device 217 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below. Further more, the above disclosure also encompasses the embodiments noted below.

Figure 3A:
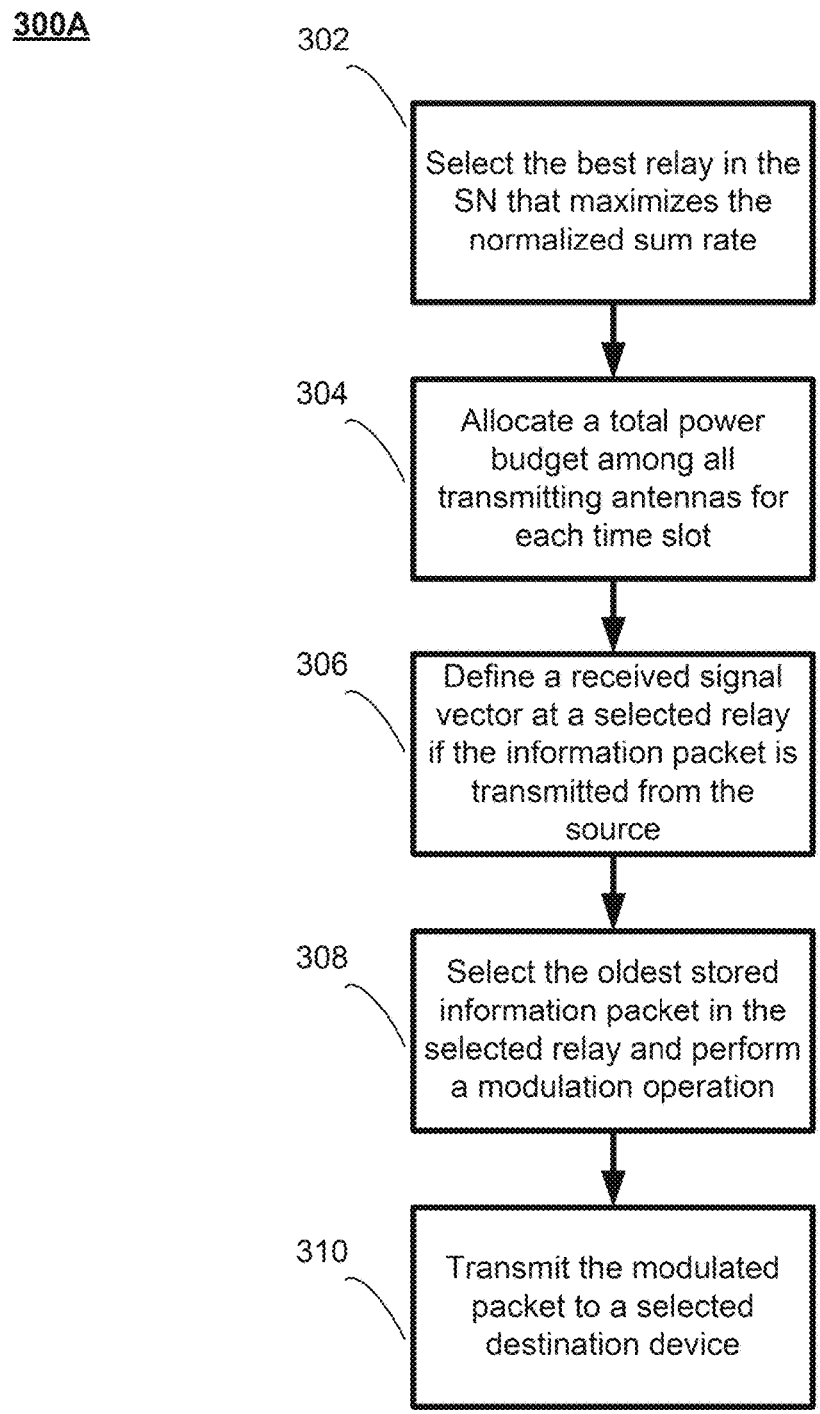
FIG. 3A is an algorithmic flowchart of an exemplary method for selecting an optimum relay and destination.
Figure 3B:
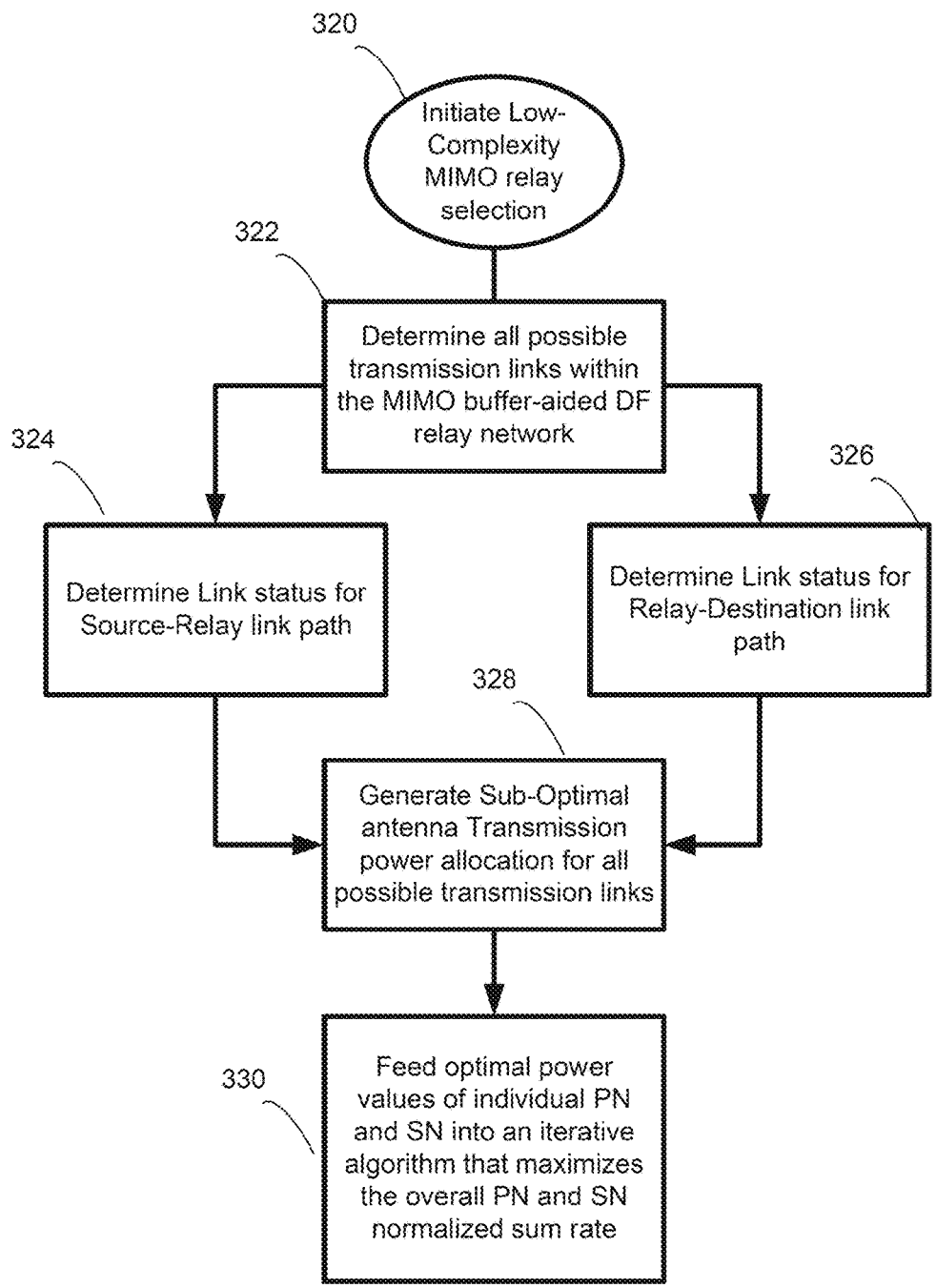
FIG. 3B is an algorithmic flowchart of an exemplary method that contains the required functions and sequence of operations to operate and monitor the exemplary model of FIG. 1.

To further enhance the performance of the cooperative MIMO network, a sub-optimal relay selection and antenna transmission power allocation method 300A and method 300B for cooperative MIMO multiple relay network may be implemented as described further in FIGS. 3A and 3B. In relay selection and antenna transmission power allocation method 300A, a processor, such as processor 203 of device 201 may select, 302, the best relay in the SN that maximizes the normalized sum rate and allocate, 304, a total power budget among all transmitting antennas for each time slot. Thereafter, processor 203 may define, 306, a received signal vector at a selected relay if the information packet is transmitted from the source, and then select, 308, the oldest stored information packet in the selected relay and perform a modulation operation. This allows the processor 203 to transmit, 310, the modulated packets to a selected destination device.

In FIG. 3B, relay selection and antenna transmission power allocation method 300B includes initiating low complexity MIMO relay selection 320, determining all possible transmission links within the MIMO buffer-aided DF relay network 322, while at the same time, determining link status for source-relay link path 324, determining link status for relay-destination 326, generating an optimal antenna transmission power values for the PN and SN individually 328, generating sub-optimal antenna transmission power allocation mapping for all possible transmission links of all the PN and SN transmitting antennas using an iterative algorithm 330. The iterative algorithm may be further based on the number of antennas within the relay network, the maximum buffer size, and a predetermined interference threshold. Equal antenna power allocation is not an efficient method of resource allocation. Accordingly, the iterative algorithm is deployed in a manner to feed optimal power values of individual PN and SN devices into an iterative algorithm that maximizes the overall PN and SN normalized sum rate.

In another example, within a first iteration of the process, the SN allocates half of the total power for distribution among all the transmitting antennas while treating the interference power from the PN as a constant and identical value. The SN allocates the power individually among the antennas and then substitutes the power values within the PN optimization algorithm. In yet another example, the iterations of the algorithm continue until no further rate enhancement is achieved.

In one aspect, the first point to address is to select the best relay in the SN that maximizes the normalized sum rate and then allocate a total power budget among all transmitting antennas for each time slot. The relay selection and antenna power allocation systems and methodologies are described herein further.

For example, when determining all possible transmission links within the MIMO buffer aided DR relay network 304 and one of S-R links is selected 306, if a data packet is transmitted from the source 110 to the selected relay R* at time instant $t_1$, the received signal vector at the selected relay R* is given by $$Y_{R^*} = \underbrace{H_{S,R^*} X_S}_{Desired\ Signal} + \underbrace{H_{S_p,R^*} X_{S_p}}_{Interfering\ Signal} + \underbrace{n_{R^*}}_{AWGN}. \quad (2)$$

where $n_{R^*}$ is the additive white Gaussian noise (AWGN) vector at the input of the selected relay's receiving antennas where $n_{R^*} = [n_{R^*}^1, n_{R^*}^2, \ldots, n_{R^*}^{M_{R^*}}]$.

When one of the R-D possible links is selected at $t_2$ after an arbitrary number of time slots $\tau = t_2 - t_1$ that lies in the period $\Psi(R_i) \leq \tau < \infty$, the relay R* takes the oldest stored data packet, modulates it by an arbitrary modulation scheme such as amplitude shift keying (ASK) or frequency shift keying (FSK) or quadrature amplitude modulation (QAM) of other multiplexing techniques such as orthogonal frequency division multiplexing (OFDM) or the like, and transmits it to destination. The received signal vector at the destination 112 at time slot $t_2$ is given by $$Y_D = \underbrace{H_{R^*,D} X_{R^*}}_{Desired\ Signal} + \underbrace{H_{S_p,D} X_{S_p}}_{Interfering\ Signal} + \underbrace{n_D}_{AWGN}. \quad (2)$$

Similarly, the received signal at $D_p$ 106 from $S_p$ 104 at time instants $t_1$ and $t_2$ are, respectively given by $$Y_{D_p}^{(1)} = \underbrace{H_{S_p,D_p} X_{S_p}}_{Desired\ Signal} + \underbrace{H_{S,D_p} X_S}_{Interfering\ Signal} + \underbrace{n_{D_p}}_{AWGN}. \quad (3a)$$

$$Y_{D_p}^{(2)} = \underbrace{H_{S_p,D_p} X_{S_p}}_{Desired\ Signal} + \underbrace{H_{R^*,D_p} X_{R^*}}_{Interfering\ Signal} + \underbrace{n_{D_p}}_{AWGN}. \quad (3b)$$

As such, the signal received at a destination device, whether it is D 112 or $D_p$ 102, may include an interfering signal from source of the another network, such as primary network 102 or secondary network 108.

To fully utilize the existence of the MIMO scheme within the network, the SVD method may be used to benefit from the fact that a MIMO channel H can be decomposed into a number of $\mathcal{R}_H$ parallel independent channels. By multiplexing independent data into these independent channels, an $\mathcal{R}_H$-fold increase in the data rate may be produced as compared to that with a single antenna system.

In one exemplary embodiment, the normalized rate at the S-R' link can be written as $$R_{S,R^*} = \log_2 \det[I_{M_{R^*}} + H_{S,R^*} R_{SS} H_{S,R^*}{}^H C_{z_1 z_1}{}^{-1}] \quad (4)$$

where $P_{SS} = \text{diag}(R_{SS})$, $R_{SS}$ is the covariance matrix of the transmitted signal, $I \in$ $$\mathbb{C}^{M_{R_i} \times M_{R_i}}$$

is the identity matrix, $(.)^H$ returns the Hermitian transpose of a matrix $(.)$ and $C_{z_1 z_1}{}^{-1}$ is the covariance matrix of the interference plus noise signal.

In general, the covariance matrix $C_{z_1 z_1}{}^{-1}$ is given by $$C_{z_1 z_1} = \mathbb{E}[(H_{S_p,R^*} X_{S_p} + n_{R^*})(H_{S_p,R^*} X_{S_p} + n_{R^*})^H]. \quad (5)$$

Using the fact that all MIMO channel matrices and the AWGN vectors are independent and uncorrelated, Eq. (5) can be simplified as $$C_{z_1 z_1} = \mathbb{E}[H_{S_p,R^*} R_{S_p} H_{S_p,R^*}^H + 2 \cdot H_{S_p,R^*} X_{S_p} n_{R^*}^H + n_{R^*} n_{R^*}^H] \quad (6)$$
$$= \mathbb{E}[H_{S_p,R^*} R_{S_p} H_{S_p,R^*}^H] + \mathbb{E}[n_{R^*} n_{R^*}^H],$$

where $P_{S_p} = \text{diag}(R_{S_p})$, $R_{S_p}$ is the covariance matrix of the transmitted signal. Using the i.i.d. assumption of MIMO channel ices and the AWGN as well and the assumption that all channel gains are slowly varying, the $(v, k)^{th}$ elements of the covariance matrix is then given by $$C_{z_1, z_1}^{v,k} = \begin{cases} \sum_{u=1}^{M_{S_p}} |h_{S_p,R^*}^{k,u}|^2 p_{S_p}^u + N_o, & \forall v = k; \\ 0, & \forall v \neq k. \end{cases} \quad (7)$$

From matrix theory, the SVD of the S-R* channel matrix $H_{S,R^*}$ can be obtained as follows $$H_{S,R^*} = U \Sigma V^H. \quad (8)$$

where $U \in \mathbb{C}^{M_{R^*} \times M_{R^*}}$, $\Sigma \in \mathbb{C}^{M_{R^*} \times M_S}$, and $V \in \mathbb{C}^{M_S \times M_S}$ are unitary matrices such that for a unitary matrix U, we have $UU^H = I$, where I is the identity matrix. The matrices V, and U are used for precoding and decoding at the source transmitting and relay receiving antennas, respectively. $\Sigma$ is a diagonal matrix of singular values $[\sigma_j]_{j=1}^{j=M_1}$, where $M_1 = \min(M_S, M_{R^*})$ and $\sigma_j^2 = \zeta_j$, where $\zeta_j$ is the $j^{th}$ eigen value of $H_{S,R^*}$, and where h is a vector subset of the channel matrix H. For example, $h_{Sp,R^*}$ is a vector subset of the channel matrix $H_{Sp,R^*}$ for the Sp-R* link, $h_{Sp,D}$ is a vector subset of the channel matrix $H_{SpD}$ for the Sp-D link, $h_{S,Dp}$ is a vector subset of channel matrix $H_{S,Dp}$ for the S-Dp link and so on. If the best selected relay R* is selected to receive data from source 110, SVD will take place on both transmitting and receiving antennas of the source, and R*, Substituting the precoding and decoding matrices in (4) and simplifying the expression yields $$R_{S,R^*} = \sum_{u=1}^{M_1} \log_2\left(1 + \frac{\zeta_u p_S^u}{\sum_{j=1}^{M_{S_p}} |h_{S_p,R^*}^{u,j}|^2 p_{S_p}^j + N_o}\right). \quad (9)$$

In a similar procedure, the normalized rate of R*-D and $S_p$-$D_p$ can be respectively written as $$R_{R^*,D} = \sum_{v=1}^{M_2} \log_2\left(1 + \frac{\zeta_v p_{R^*}^v}{\sum_{j=1}^{M_{S_p}} |h_{S_p,D}^{v,j}|^2 p_{S_p}^j + N_o}\right), \quad (10a)$$

$$R_{S_p,D_p}^{(1)} = \sum_{l=1}^{M_3} \log_2\left(1 + \frac{\zeta p_{S_p}^l}{\sum_{j=1}^{M_S} |h_{S,D_p}^{l,j}|^2 p_S^j + N_o}\right), \quad (10b)$$

$$R_{S_p,D_p}^{(2)} = \sum_{l=1}^{M_3} \log_2\left(1 + \frac{\zeta p_{S_p}^l}{\sum_{j=1}^{M_{R^*}} |h_{R^*,D_p}^{l,j}|^2 p_{R^*}^j + N_o}\right), \quad (10c)$$

where $M_2 = \min(M_{R^*}, M_D)$, $M_3 = \min(M_{S_p}, M_{D_p})$, and $R_{S_p,D_p}^{(1)}$ and $R_{S_p,D_p}^{(1)}$ are the normalized rate of the PN when the S-R* or R*-D link are selected for transmission in the SN, respectively.

In one embodiment, the selection of the best relay R* for reception or transmission is first determined and then efficiently allocating a total power budget $P_T$ among all primary and secondary transmitting antennas at a certain time slot to maximize the PN and SN normalized sum rate of the network. An optimization problem that occur when S-R* link is selected is formulated as $$\underset{P_S, P_{S_p}}{\text{maximize}} \; R_{S,R^*} + R_{S_p,D_p}^{(1)} \quad (11)$$

$$\text{subject to} \; 0 \leq \sum_{u=1}^{M_S} p_S^u + \sum_{v=1}^{M_{S_p}} p_{S_p}^v \leq P_T,$$

$$\sum_{v=1}^{M_{D_p}} \sum_{u=1}^{M_S} |h_{S,D_p}^{v,u}|^2 p_S^u \leq I_{th}.$$

On the other hand, an optimization problem that occur when R*-D link is selected is formulated as $$\underset{P_{R^*}, P_{S_p}}{\text{maximize}} \; R_{R^*,D} + R_{S_p,D_p}^{(2)} \quad (12)$$

$$\text{subject to} \; 0 \leq \sum_{u=1}^{M_{R^*}} p_{R^*}^u + \sum_{v=1}^{M_{S_p}} p_{S_p}^v \leq P_T,$$

$$\sum_{v=1}^{M_{D_p}} \sum_{u=1}^{M_{R^*}} |h_{R^*,D_p}^{v,u}|^2 p_{R^*}^u \leq I_{th}.$$

In buffer-aided relaying, when the S-R and R-D links are selected for transmission in two subsequent time slots, the relay that receives an information packet in the first time slot is not necessarily the same relay which may transmit a packet signal to the destination in the second time slot. This means that the best receiving and transmitting relays are selected separately. In MIMO cooperative buffer-aided relay networks 100, the optimal relay from multiplexing gain point of view is the one that results in a maximum normalized rate. In one example, a maximum normalized rate may result in a maximum data throughput, however, resulting in power levels not being minimized. Finding the maximum normalized rate requires first optimizing the antenna transmission power for all available relays and then selecting the link that gives the maximum rate. This relay selection procedure can be time consuming.

Accordingly, for the system model under consideration, the selection of the optimal relay that maximizes the normalized sum rate is achieved using the following criterion $$R_{i,Opt} = \max_i (R^{(1)}_{S_p,R_p} + R_{S,R_i}, R^{(2)}_{S_p,R_p} + R_{R_i,D}), \quad (10)$$

where $R_{S_p,R_p}^{(1)}$ and $R_{S_p,R_p}^{(2)}$ are the normalized rates of the PN when the S-R and R-D links are selected for transmission in the SN, respectively. This proposed criterion is considered as a modified Max-Link relay selection at which the PN rate is added to the single-hop rate of the SN for being considered as a compound metric. The Max-Link relay selection takes into consideration the content of relay buffers, i.e., the relays with full buffers are not selected for reception and the relays with empty buffers are not selected for transmission. In this work, the best relay selection is achieved with the assumption of equal power allocation. This means that all transmitting antennas of the PN and SN are assumed to have equal power values that sum to $P_T$.

In one embodiment, the best relay may be selected utilizing the concept of SVD with the assumption of equal power allocation. While power allocation is ideal when the operation is focused on optimizing the rate directly, in this case, however, one exemplary embodiment would initially focus on reducing complexity and processing time of MIMO based relay selection and then, after relay selection is performed, power allocation scheme may be further devised as will be further described below.

Using the derived expressions in (9) and (10), the proposed relay selection scheme can be written as $$R^* = \max_i (f_{S,R_i}, f_{R_i,D}), \text{ where} \quad (14a)$$

$$f_{S,R_i} = \prod_{v=1}^{M_1}\left(1 + \frac{\zeta_v^i P_T}{P_T \sum_{j=1}^{M_{S_p}} |h_{S_p,R_i}^{v,j}|^2 + N_o M_{T_1}}\right) + \quad (14b)$$

$$\prod_{l=1}^{M_3}\left(1 + \frac{\zeta_l p_{S_p}^l}{\sum_{j=1}^{M_S} |h_{S,D_p}^{l,j}|^2 p_S^j + N_o}\right),$$

$$f_{R_i,D} = \prod_{k=1}^{M_2}\left(1 + \frac{\zeta_k^i P_T}{P_T \sum_{j=1}^{M_{S_p}} |h_{S_p,D}^{v,j}|^2 + N_o M_{T_2}}\right) + \quad (14c)$$

$$\prod_{m=1}^{M_3}\left(1 + \frac{\zeta_m p_{S_p}^l}{\sum_{j=1}^{M_{R_i}} |h_{R_i,D_p}^{m,j}|^2 p_{R_i}^j + N_o}\right),$$

where $\zeta_v^i$ and $\zeta_k^i$ are the $v^{th}$ and $k^{th}$ eigen values generated from the channel matrices $H_{S,R_i}$ and $H_{R_i,D}$, respectively, and $\zeta_l$ and $\zeta_m$ are the $l^{th}$ and $m^{th}$ eigen s generated from the channel matrix $H_{S_p,D_p}$ when be S-R and R-D links are selected for transmission, respectively. The proposed relay selection scheme may takes all possible MIMO channel gains into consideration and selects the one that maximizes the S-R or R-D normalized rate plus the $S_p$-$D_p$ normalized rate considering the two-way interference of both PN and SN.

In one embodiment, a sub-optimal solution of antenna transmission power allocation is utilized to allocate a total power budget among all PN and SN transmitting antennas per time slot to maximize the normalized sum rate. Deriving an optimal solution for problems formulated in (11, 12) is a complicated procedure due to the high-nonlinearity of the target functions which are considered as non-programmable functions. In the proposed scheme, closed-form expressions for the optimal antenna transmission power that maximize the PN and SN rates are derived separately. That is the optimal transmission power allocation expressions of each primary and secondary networks are first derived independently. Furthermore, the derived expressions are then combined in an iterative algorithm that maximizes the overall sum rate.

Irrespective of the PN, the optimization problem related to the S-R* link of the SN can be formulated as follows $$\underset{P_S}{\text{maximize}} \; R_{S,R^*} \quad (15)$$

$$\text{subject to } 0 \le \sum_{u=1}^{M_S} p_S^u + \sum_{v=1}^{M_{S_p}} p_{S_p}^v \le P_T,$$

$$\sum_{v=1}^{M_{D_p}} \sum_{u=1}^{M_S} |h_{S,D_p}^{v,u}|^2 p_S^u \le I_{th}.$$

Additionally, when the S-R* link is selected, the optimization problem related to the PN irrespective of the SN can be formulated as follows $$\underset{P_{S_p}}{\text{maximize}} \; R^{(1)}_{S_p,D_p} \quad (16)$$

$$\text{subject to } 0 \le \sum_{u=1}^{M_S} p_S^u + \sum_{v=1}^{M_{S_p}} p_{S_p}^v \le P_T.$$

To solve (15), the Lagrangian multiplier method is used. The Lagrangian function and its optimal solution are provided in (17) and (18), respectively as follows $$\mathcal{L}_1(P_s, \lambda_1, \lambda_2) = \sum_{u=1}^{M_1} \log_2\left(1 + \frac{\zeta_u^{i^*} p_s^u}{\sum_{j=1}^{M_{S_p}} |h_{S_p,R^*}^{u,j}|^2 p_{S_p}^j + N_o}\right) - \lambda_1\left(\sum_{u=1}^{M_S} p_s^u + \sum_{v=1}^{M_{S_p}} p_{S_p}^v - P_T\right) - \lambda_2\left(\sum_{v=1}^{M_{D_p}} \sum_{u=1}^{M_S} |h_{S,D_p}^{v,u}|^2 p_s^u - I_{th}\right), \quad (17)$$

$$p_s^u = \frac{1}{\log_e 2\left[\lambda_1 + \lambda_2 \sum_{v=1}^{M_{D_p}} |h_{S,D_p}^{v,u}|^2\right]} - \frac{\sum_{j=1}^{M_{S_p}} |h_{S_p,R^*}^{u,j}|^2 p_{S_p}^j + N_o}{\zeta_u^{i^*}}, \quad (18)$$

$$\forall\, 1 \leq u \leq M_S,$$

where $\lambda_1$ and $\lambda_2$ are the Lagrangian multipliers related to peak source transmission power and interference constraints, respectively. The value of the Lagrangian multipliers $\lambda_1$ and $\lambda_2$ are chosen such that they maximize $\mathcal{L}(P_s, \lambda_1, \lambda_2)$ in (17). However, their optimal values lie between one and zero. One efficient method to find $\lambda_1$ and $\lambda_2$ is called the sub-gradient update method and it is given by $$\lambda_1^{(m+1)} = \left[\lambda_1^{(m)} + \mu^{(m)}\left(\sum_{u=1}^{M_S}(p^m)_s^u + \sum_{v=1}^{M_{S_p}} p_{S_p}^v - P_T\right)\right]^+, \quad (19a)$$

$$\lambda_2^{(m+1)} = \left[\lambda_2^{(m)} + \mu^{(m)}\left(\sum_{v=1}^{M_{D_p}} \sum_{u=1}^{M_S} |h_{S,D_p}^{v,u}|^2 (p^m)_s^u - I_{th}\right)\right]^+, \quad (19b)$$

where in is the iteration index, $\lambda^{(m)}$ is a sequence of scalar step sizes, and $[\eta]^+ = \max(\eta, 0)$. It was found that due to the convexity of the target function, the sub-gradient method converges to the optimal values as long as $\mu^{(m)}$ is chosen to be sufficiently small.

In a similar procedure, when the R*-D link is selected, the optimal antenna transmission power expressions for R* are given by $$p_{R^*}^u = \frac{1}{\log_e 2\left[\lambda_3 + \lambda_4 \sum_{v=1}^{M_{D_p}} |h_{R^*,D_p}^{v,u}|^2\right]} - \frac{\sum_{j=1}^{M_{S_p}} |h_{S_p,D}^{u,j}|^2 p_{S_p}^j + N_o}{\zeta_u^{i^*}}, \quad (20)$$

$$\forall\, 1 \leq u \leq M_{R^*},$$

where $\lambda_3$ and $\lambda_4$ are the Lagrangian multipliers related to peak source transmission power and interference constraints, respectively.

For the PN, the optimal antenna transmission power expressions when the S-R* and R*-D links are selected are given, respectively as $$p_{S_p}^u = \frac{1}{\lambda_5 \log_e 2} - \frac{\sum_{j=1}^{M_{S_p}} |h_{S,D_p}^{u,j}|^2 p_{S_p}^j + N_o}{\zeta_u}, \quad (21a)$$

$$\forall\, M_S + 1 \leq u \leq M_S + M_{S_p},$$

$$p_{S_p}^u = \frac{1}{\lambda_5 \log_e 2} - \frac{\sum_{j=1}^{M_{S_p}} |h_{R^*,D_p}^{u,j}|^2 p_{S_p}^j + N_o}{\zeta_u}, \quad (21b)$$

$$\forall\, M_{R^*} + 1 \leq u \leq M_{R^*} + M_{S_p}.$$

where $\lambda_5$ is the Lagrangian multiplier related to peak source transmission power.

Figure 4:
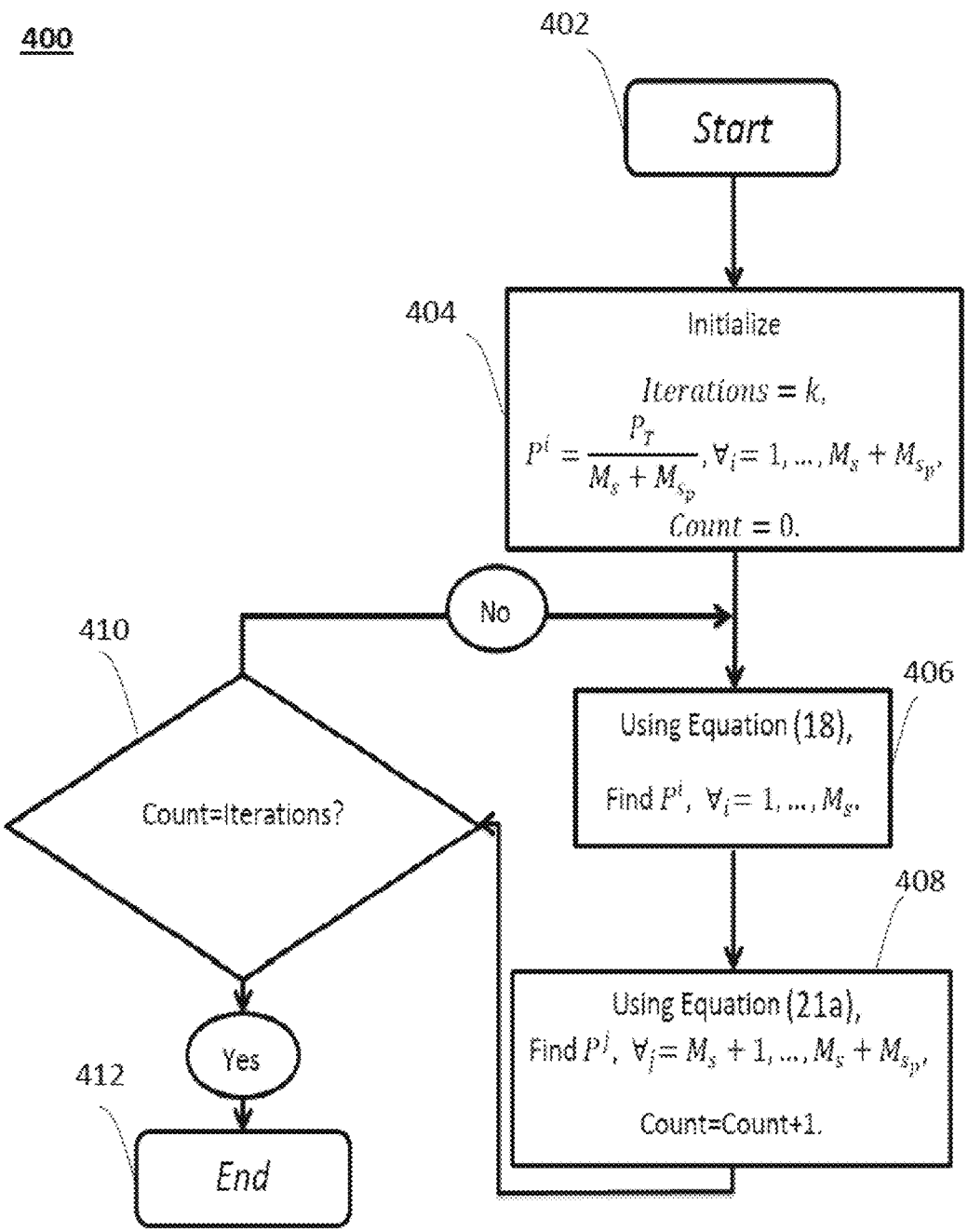
FIG. 4 is an algorithmic flowchart of an exemplary algorithm that allocate a total power budget for all transmitting antennas of the primary and secondary networks per time slot.

FIG. 4 illustrates an exemplary method 400 of a global power allocation scheme applied for allocating a total power budget $P_T$ among all PN and SN transmitting antennas per time slot when S-R* link is selected and maximize $R_{S_p,D_p}^{(1)} + R_{S,R^*}$. Method 400 includes a starting initialization point 402, which first defines a global power vector $P = [P_s : P_{S_p}]$ of length $M_{S_p} + M_s$. Method 400 further includes setting the number of iterations taken by the process to k. The number of iterations k is chosen to be large enough until no further enhancements in the sum rate are achieved. Generally, the number of iterations k of the algorithm are set to be adaptive based on some stopping criterion that takes place when no further sum rate enhancement achieved. In the first iteration of this algorithm 402, the SN is assigned one half of the total power budget $P_T$ 404 and then this half is optimally allocated among all SN transmitting antennas 406. This is done assuming that the PN interference on the SN has equal transmission power per antenna that sums to $$\frac{P_T}{2}.$$

The optimal values generated from the process at 406 are then substituted in the optimization problem of the PN and the total power budget assigned to the PN along with the SN interference power are adjusted accordingly 408. This algorithm ensures that at each iteration, the antenna transmission power values are close to the optimal values and that the interference threshold constraint is still maintained 410. The same algorithm can be used to maximize $R_{S_p,D_p}^{(2)} + R_{R^*,D}$.

From a complexity point of view, solving problems (11, 12) via an exhaustive search (ES) numerical programming algorithm requires a number of operations that is given by $\sum_{i=0}^{q} \binom{NM}{i}(q-1)^i = O(q^{MN})$ operations to find the optimal solution, while the proposed sub-optimal solution requires only $2Mk = O(Mk)$ operations, where q is the quantization levels of the ES algorithm and M is the sum PN and SN transmitting antennas at a certain time slot. For example, with $\{M,N,q,k\} = \{4, 4, 64, 5\}$, the complexity order is $\{8 \times 10^{28}, 120.18, 2\}$ for the ES, the proposed and the separate schemes respectively. Table 1 below illustrates the central processing unit time duration of different schemes for 100 channel realization. Accordingly, the sub-optimal method further enhances the performance of the processor, such as processor 202, hence, requiring less time to achieve the desired selections and thus providing more efficient processing and power management.

TABLE I

Central processing unit times in seconds
for 100 channel realizations.

| Optimal | Proposed | Separate |
|---|---|---|
| $2 \times 10^7$, ∞ | {M, N, q, k} = {1, 4, 64, 1} 15 | 11.7 |
| $3 \times 10^{14}$, ∞ | {M, N, q, k} = {2, 4, 64, 3} 60.43 | 11.7 |
| $8 \times 10^{28}$, ∞ | {M, N, q, k} = {4, 4, 64, 5} 120.18 | 11.7 |

As a result of the iterative process, FIGS. 5-10 provide numerical simulation results of the proposed MIMO-based relay selection and antenna transmission power allocation strategies. In one embodiment, a Monte-Carlo simulation program may be run for 1,000,000 iterations. To decrease simulation complexity, certain assumptions can be utilized. Such assumptions include configured all receiving nodes to be subjected to constant power spectral density $N_o$. It may further be assumed that all transmitting and receiving nodes are equipped with the same number of antennas, that is $M_S = M_R = M_D = M_{S_p} = M_D = M_{D_p} = M$.

Figure 5:
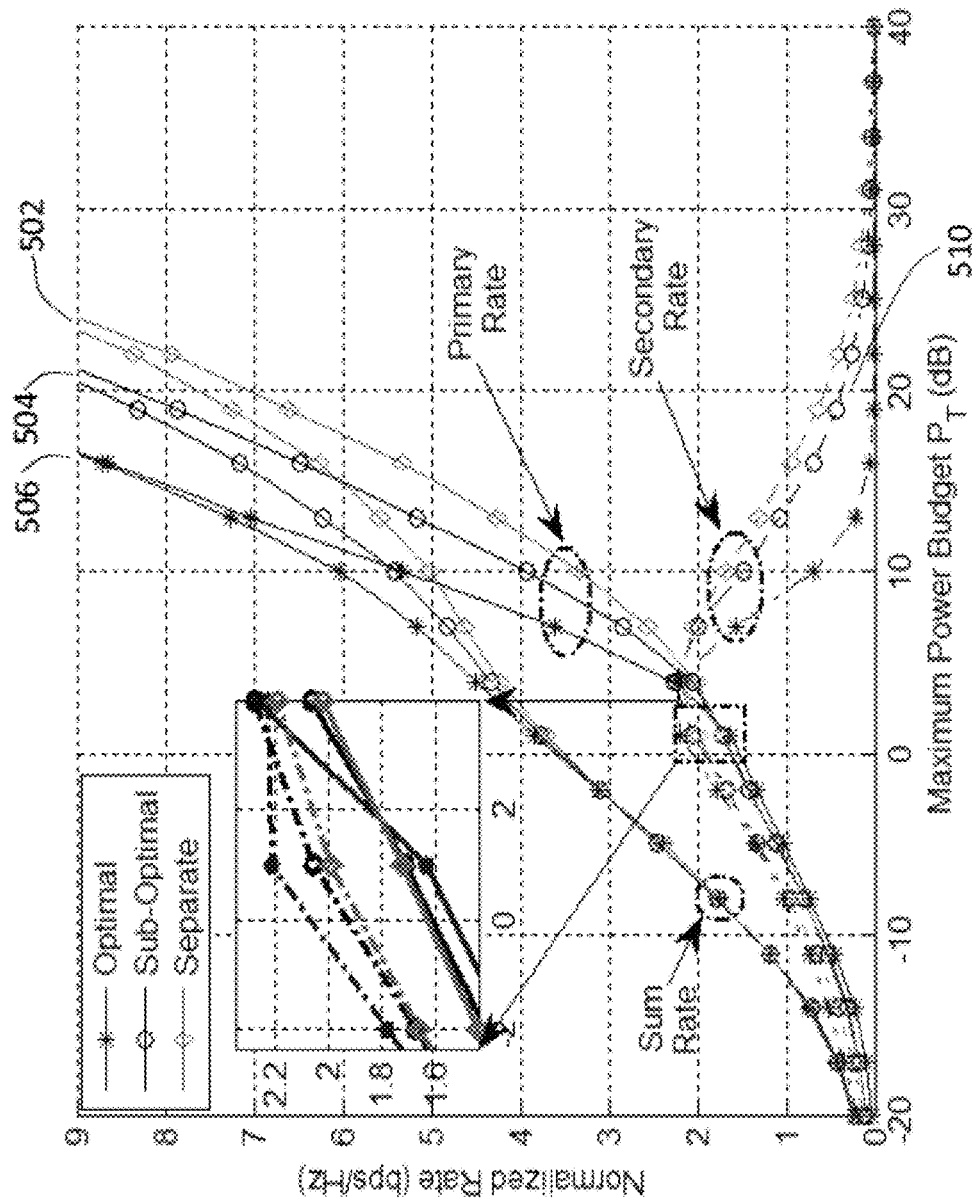
FIG. 5 is an exemplary view of an achievable primary, secondary and sum normalized rates for the optimal, sub-optimal and separate methods.

FIG. 5 illustrates an exemplary view of an achievable performance level that considers separate 502, sub-optimal 504 and optimal 506 relay selection and antenna transmission power allocation schemes. The achievable primary and secondary average normalized rates for the optimal simulated solution, the proposed sub-optimal solution and the separate optimal solution are illustrated with $I_{th}$=10 dB, M=4, N=4, and k=5, where k is the number of iterations in the proposed power optimization algorithm. The separate power allocation scheme divides maximum power budget $P_T$ equally between primary and secondary network and then optimize the rate of each network separately using the optimally derived expressions and considering the interference power to be equal power allocation scheme divided by the number of antennas:

$$P_{Interference} = \frac{P_T}{M}.$$

As previously described, while the PN and SN may optimally operate if they work separately, however, because PN and SN are working simultaneously, they must be processed together. Accordingly, relay selection and power allocation should consider both the PN and SN in a sub-optimal power allocation solution.

As can be noticed in FIG. 5, the proposed sub-optimal relay selection and antenna transmission power allocation scheme 504 introduces a sub-optimal performance level that lies between the optimal solution 506 and the separate allocation schemes 502. Furthermore, it can be noticed that at $P_T$=10 dB, the proposed scheme achieves a gain of 1.5 bps/Hz in the PN rate compared to the equal power allocation scheme. It can be also noticed that using the optimal solution, the secondary rate decays drastically to zero after passing $I_{th}$. However, the proposed sub-optimal scheme maintains a fair power assignment to the SN that is closer to the separate allocation scheme. This is due to the fact that for the optimal scenario where the total sum rate is optimized, the PN gets most of the available power budget due to interference constraints on the SN transmission power, especially at high $P_T$. Point 510 illustrates that the sub-optimal solution 504 maintains a fair power assignment to the secondary network (secondary network rate decay is less than optimal solution 506) while also providing more power to the primary network. As such, in underlay cognitive radio, the secondary user interference must not exceed a predefined interference threshold value $I_{th}$.

Figure 6:
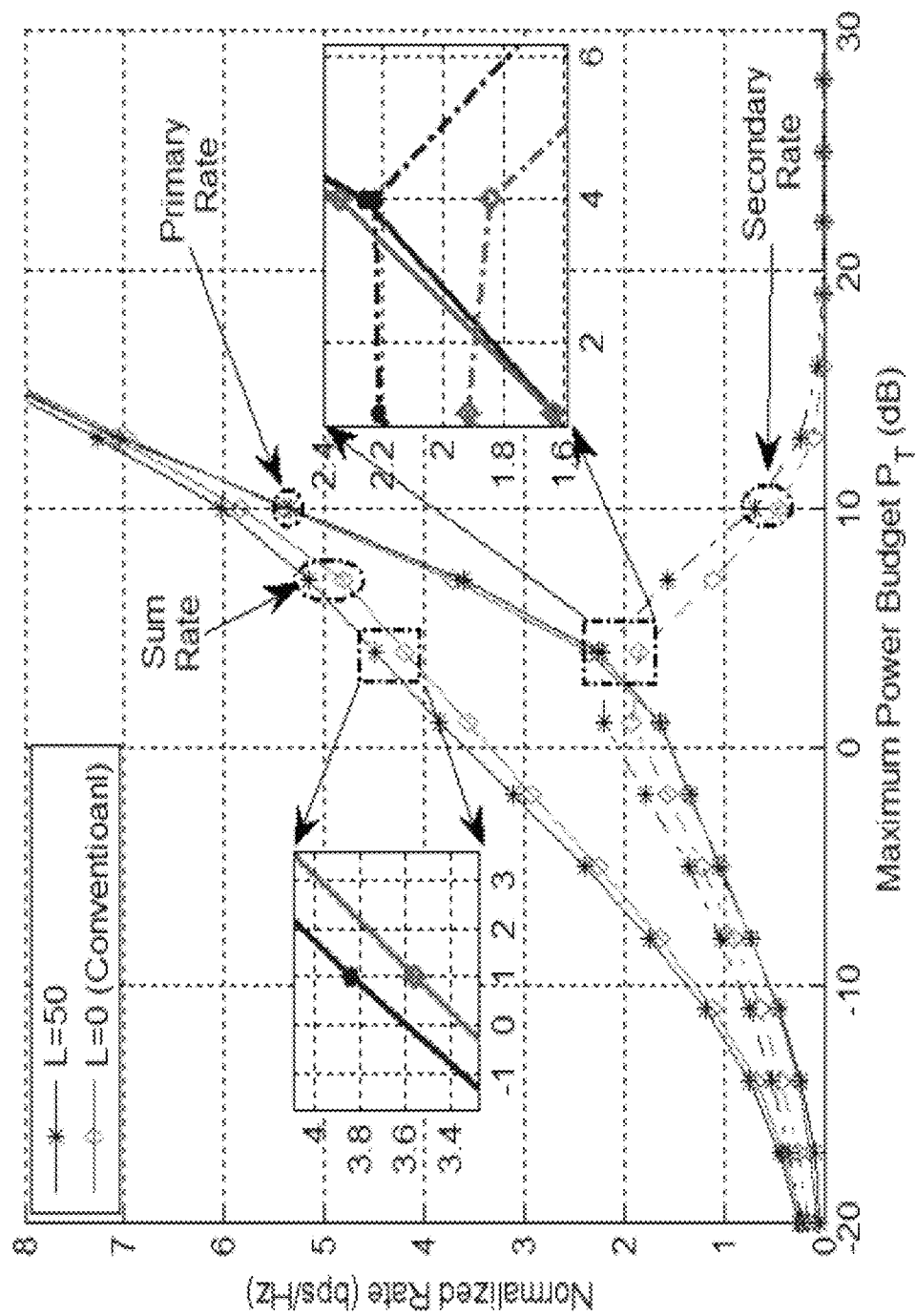
FIG. 6 is an exemplary view of an achievable primary, secondary and sum normalized rates versus different buffer maximum sizes denoted by L.

FIG. 6 illustrates an exemplary view of the achievable normalized rate values versus different maximum buffer sizes. It can be seen from this figure that an increment of around 0.5 bps/Hz is achieved in the SN rate when adding a buffer of size L=50 at $P_T$=4 dB. Additionally, it can be noticed from this figure that the physical layer buffering on the SN relay nodes slightly decreases the normalized rate of the PN. This is due to the fact that buffering guarantees a better channel gains are achieved for the SN which means that more power is invested on these higher gain links. Accordingly, the interference on the PN that is caused by the SN transmission power increases. However, it is clear that the overall sum rate is enhanced by the buffering process in the SN. Accordingly, the buffer-aided relaying enhances only the SN since relays transmit only the SN signal while the PN doesn't uses any relays. In underlay cognitive radio, the primary network sets its own conditions including the one that the secondary network transmission power must not exceed a certain threshold value. That's why the SN looks for different strategies to enhance its performance (such as buffer-aided relaying, increasing the number of relays or increasing the number of antennas) rather than increasing the transmission power of the secondary network. At that point the value of L (buffer size) may be increased as desired even if the primary network performance degrades.

Figure 7:
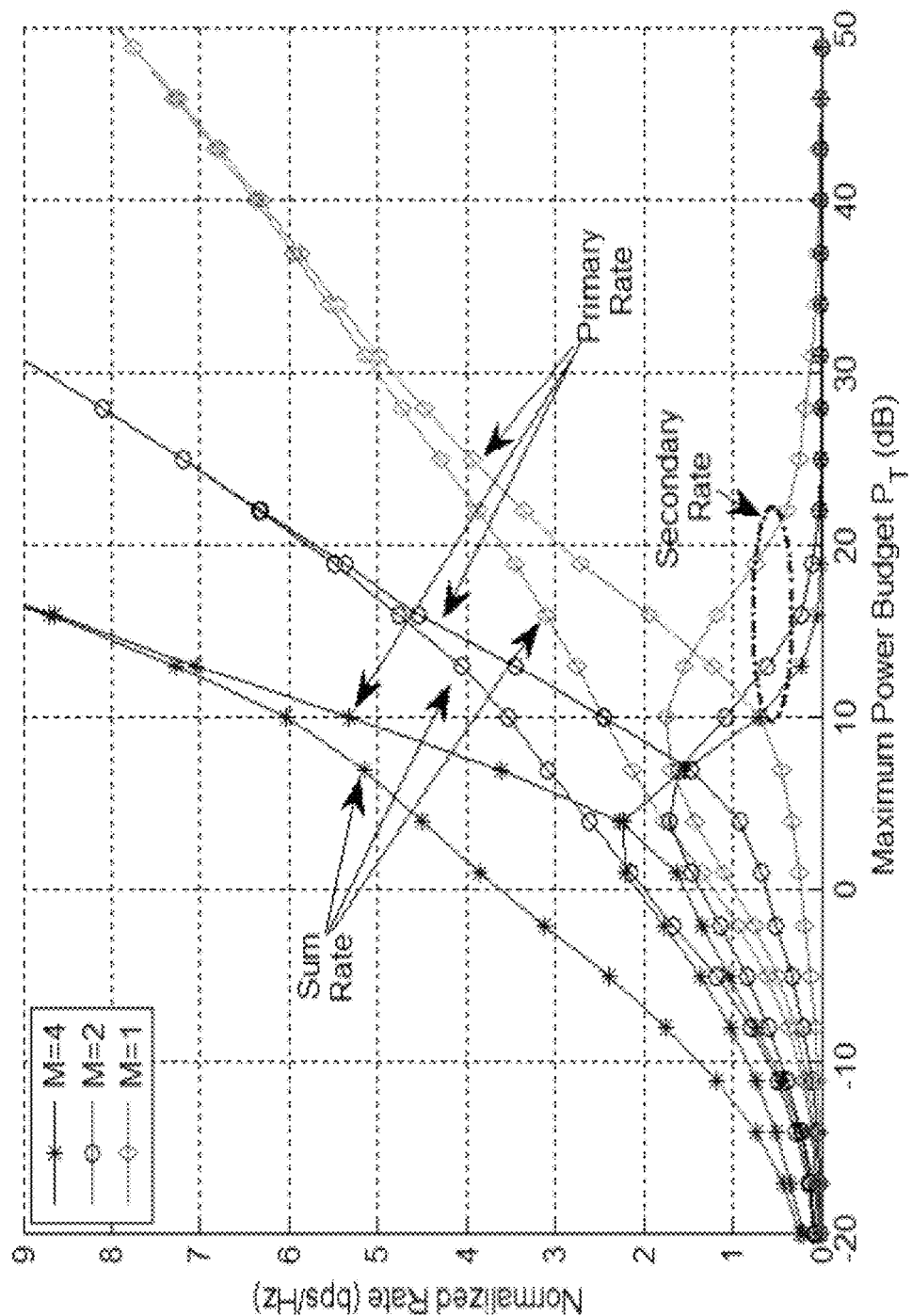
FIG. 7 is an exemplary view of an achievable primary, secondary and sum normalized rates versus different number of antennas denoted by M.

FIG. 7 illustrates an exemplary view of the effect of increasing number of antennas M on the overall network performance. It can be noticed from this figure that the overall sum rate of the PN and SN enhances significantly with increasing the number of antennas in the network.

Figure 8:
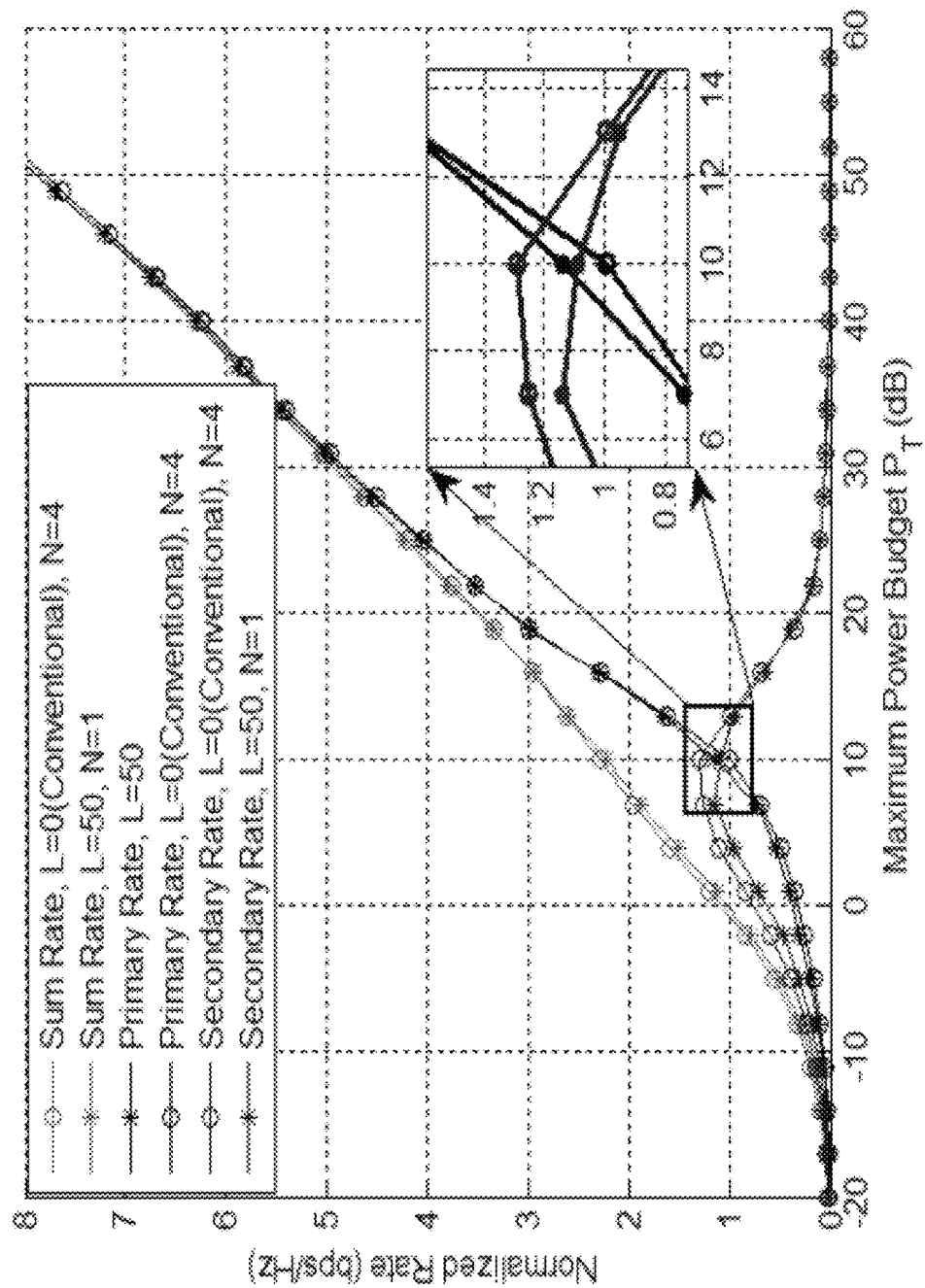
FIG. 8 is an exemplary view of an achievable primary, secondary and sum normalized rates of both conventional and buffer-aided relaying with different number of relays denoted by N.

FIG. 8 illustrates the impact of physical layer buffering and number of relays on the system performance. It can be noticed from this figure that adding a buffer of maximum size L=50 to a cooperative network with a single relay node achieves a performance level that is almost identical to a cooperative network with four conventional unbuffered relays. Of course, this cost and complexity reduction is compromised by the fact that buffering introduces a delay to the transmitted message that could be infinite and hence, a higher possibility for packet loss.

Figure 9:
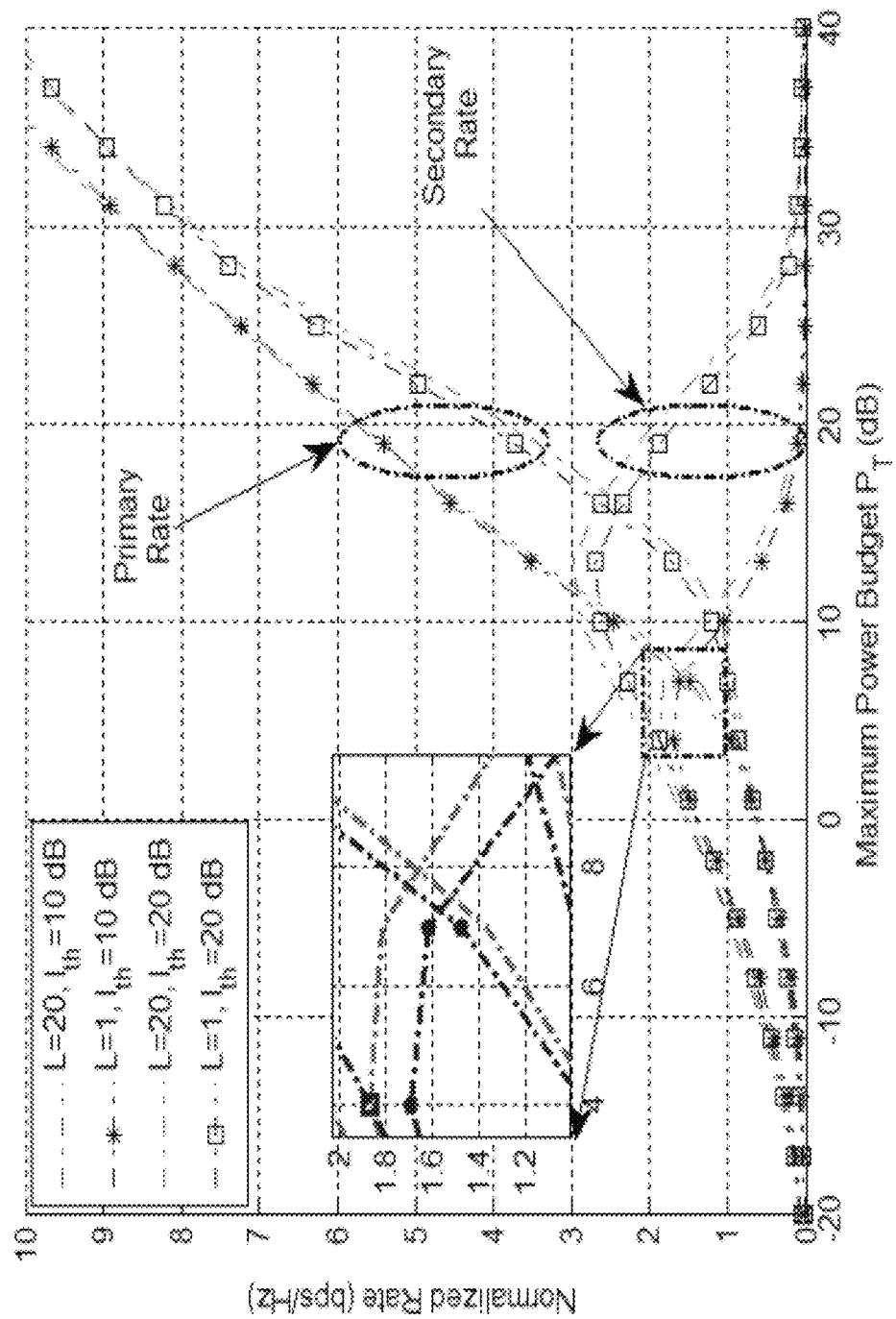
FIG. 9 is an exemplary view of an achievable primary, secondary and sum normalized rates versus different interference power constraint values and different maximum buffer sizes L.

FIG. 9 studies the effect of increasing the maximum buffer size with two different interference threshold values on the system performance. It can be noticed from this figure that with higher interference threshold values, increasing the buffer size is beneficial for the system performance to ore than the case of lower interference threshold value. This is due to the fact that when the interference constraint is more relaxed, a better utilization of buffering can be achieved at high total transmission power values.

Figure 10:
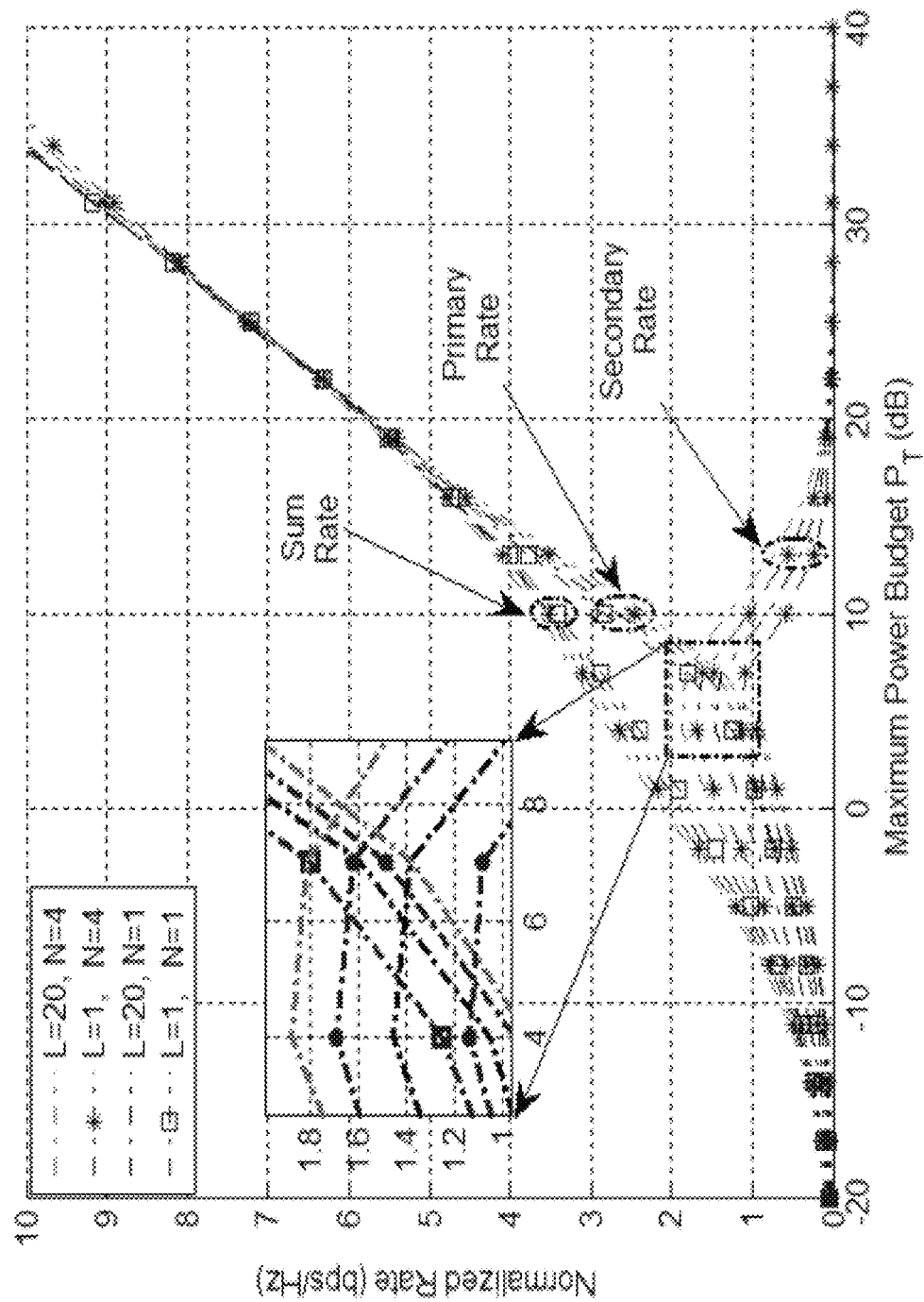
FIG. 10 is an exemplary view of an achievable primary, secondary and sum normalized rates versus different number of maximum buffer sizes L and different number of relays N.

FIG. 10 illustrates the impact of increasing the maximum buffer size for different numbers of available relays in the network. It can be noticed from this figure that the best utilization of physical layer buffering is achieved with lower number of relays. This is expected since higher number of relays in the network enhances the diversity order of the network to its maximum value. Accordingly, any further enhancement (either by buffering or any other techniques) will not add much gain to the overall network performance. Additionally, a plurality of lines for each interference constraint power may be displayed to illustrate the effect of changing the interference threshold conditions on the overall network performance.

Exemplary aspects of the disclosure are described herein. A low complexity-MIMO-based relay selection and sub-optimal antenna transmission power allocation scheme for cognitive MIMO buffer-aided DF relaying network are introduced. The convex optimization theory was used to derive closed-form expressions for the optimal transmission power that maximizes the primary and secondary rates individually. Then, the derived expressions were used in an iterative algorithm that globally allocates a total power budget among all transmitting antennas of the PN and SN nodes. One aspect of the proposed disclosure is found to have a performance level that is close to the optimal solution with a far less complex infrastructure and management scheme and is significantly better than the separate antenna transmission power allocation scheme, where the total power budget is divided equally between the PN and SN. As a result, physical layer buffering in relay networks significantly enhances the secondary network performance compared to the case of conventional unbuffered relaying schemes.

In one exemplary embodiment of the disclosure, there is proposed a low complexity MIMO-based relay selection method deployed in MIMO-based relay systems that utilizes sub-optimal antenna transmission power allocation for a selected cognitive MIMO buffer-aided DF relaying network. Convex optimization may be used to derive closed-form expressions for optimal transmission power that maximizes primary and secondary network rates individually. The derived expressions may then be used in an iterative algorithm that globally allocates a total power budget among all transmitting antennas of the overall network per time slot and maximizes the normalized sum rate. The proposed scheme is found to have a performance level that is close to optimal solution and significantly better than the separate allocation scheme.

In yet another embodiment, DF buffer-aided relay selection is considered and antenna transmission power allocation for underlay CR network that is equipped with MIMO antenna scheme. A MIMO-based relay selection scheme that maximizes the single-hop normalized sum rate is proposed. Furthermore, a sub-optimal scheme of antenna transmission power allocation that maximizes the overall normalized sum rate of primary and secondary cognitive network is also proposed. To do so, one method is to derive optimal expressions antenna transmission power for both primary and secondary networks separately. The derived expressions are then used in an iterative algorithm to produce a near-optimum solution. Simulation results are provided to evaluate the performance of the proposed MIMO-based relay selection and antenna power allocation schemes and compare their performance with that of optimal schemes. Impacts of several system parameters including buffer maximum size, interference threshold, and number of antennas on network performance are also investigated. Results reveal that the proposed sub-optimal relay selection and transmission power allocation schemes introduce an acceptable performance with much lower complexity compared to the optimal schemes. It also shows that a better utilization of buffering is achieved with higher number of antennas on each transceiver node and/or higher number of relays within the network.

In yet another embodiment, decode-and-forward (DF) buffer-aided relay selection and antenna transmission power allocation schemes are considered for underlay cognitive radio (CR) relay networks. All transmitting and receiving nodes in the network are equipped with multiple-input multiple-output (MIMO) antenna scheme. First, a low complexity MIMO-based relay selection scheme that maximizes the single-hop normalized sum rate of the primary network (PN) and secondary network (SN) is proposed. Second, a sub-optimal antenna transmission power allocation scheme that maximizes the single-hop normalized sum rate of the PN and the SN is proposed. For power optimization, first, optimal expressions for the transmission power per antenna of both the PN and SN nodes are derived separately. The derived expressions are then used in an iterative algorithm to produce a near-optimum solution that maximizes the normalized sum rate per time slot. Simulation results are provided to evaluate the performance of the proposed MIMO-based relay selection and antenna transmission power allocation schemes and compare their performance with that of the optimal scenario. Additionally, the impact of several system parameters including maximum buffer size, interference threshold and number of antennas on the network performance is also investigated. Lower complexity of the network is achieved compared to optimal relay selection and power allocation schemes. Additionally using buffer-aided relaying significantly enhances the SN performance while slightly weakens the performance of the PN.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an" and "the" include plural referents unless the context clearly dictates otherwise.

What is claimed is:

1. A method for relay selection within a cognitive radio network, the method being performed by a processor, the method comprising:

identifying one or more primary source devices and primary destination devices within a primary network of the cognitive radio network;

identifying one or more secondary source devices and secondary destination devices, and a predetermined number of cognitive relays within a secondary network of the cognitive radio network;

transmitting data packets from the primary network for every time slot during network operation on a continuous basis; and selecting a source relay link or a relay destination link within the secondary network to transmit predetermined data based on a modified Max-Link relay selection with set criterion of $$R_{i,Opt} = \max_i (R^{(1)}_{S_p,R_p} + R_{S,R_i}, R^{(2)}_{S_p,R_p} + R_{R_i,D}).$$

where $R_{S_p,R_p}^{(1)}$ and $R_{S_p,R_p}^{(2)}$ are the normalized rates of the primary network, $R_{s,R_i}$ is the channel matrix for a link between source and relay i, and $R_{R_i,D}$) is the channel matrix for a link between relay $R_i$ and destination D, wherein the one or more primary source devices, primary destination devices, secondary source devices, secondary destination devices and cognitive relays are multiple-input multiple-output (MIMO) devices, selecting an oldest data packet stored in the relay link and perform a modulation operation to provide a modulated data packet, transmitting the modulated data packet to a destination link;

the method further comprising
identifying a MIMO channel for transmission on a source-relay link, or a relay-destination link on the secondary network;
dividing the MIMO channel into a predetermined number of parallel, independent, and ranked channels; and
enhancing efficiency of power usage by
allocating a transmission power budget, and
distributing the transmission power budget among primary and secondary transmitting antenna devices at a predetermined time interval.

2. The method of claim 1, further comprising:
generating a data rate equivalent in magnitude to the highest rank level of the MIMO channels.

* * * * *